United States Patent [19]

Betz

[11] 4,001,906
[45] Jan. 11, 1977

[54] MACHINE FOR CUTTING SLOTS IN SCREW SHANKS

[76] Inventor: John N. Betz, 4624 Redbluff Drive, Rockford, Ill. 61107

[22] Filed: Aug. 14, 1975

[21] Appl. No.: 604,618

[52] U.S. Cl. .................................... 10/2; 10/20.5; 10/165; 10/169
[51] Int. Cl.² ..................... B23G 9/00; B23G 11/00
[58] Field of Search ............... 10/2, 6, 9, 10 R, 21, 10/20.5, 165, 169

[56] References Cited
UNITED STATES PATENTS

| 663,122 | 12/1900 | Hakewessell et al. | 10/6 |
|---|---|---|---|
| 1,839,490 | 1/1932 | Moeller | 10/165 |
| 1,872,564 | 8/1932 | Stimpson | 10/20.5 |
| 2,674,754 | 4/1954 | Hale | 10/20.5 |
| 3,056,981 | 10/1962 | Byam | 10/21 |
| 3,210,786 | 10/1965 | Moeltzner | 10/21 |
| 3,280,412 | 10/1966 | Hanneman et al. | 10/2 |
| 3,422,472 | 1/1969 | Pomernacki | 10/6 |
| 3,585,665 | 6/1971 | Jackson | 10/6 |
| 3,786,527 | 1/1974 | Morton et al. | 10/169 |

*Primary Examiner*—C.W. Lanham
*Assistant Examiner*—E. M. Combs
*Attorney, Agent, or Firm*—Leydig, Voit, Osann, Mayer & Holt, Ltd.

[57] ABSTRACT

A machine for cutting slots in the shanks of screws includes a frame supporting a rotatable shaft with a disk attached thereto. A plurality of notches are formed in the periphery of the disk for carrying the screws and the shaft is rotated intermittently by an indexing means to move the disk along a predetermined path extending through fastener-receiving, slotting and exit stations. At the slotting station, two saws are advanced from retracted positions relative to the disk to cut slots in the shanks of two screws during a dwell period of the machine. At the fastener-receiving station, the fasteners are fed down a ramp from a feeder and are guided into the peripheral notches in the disk. An adapter fastened on the shaft above the disk includes a plurality of clamping members movable toward and away from the disk to clamp the fasteners on the disk as the fasteners are carried along the path through the slotting station. Mounted on an arm pivotally secured to the frame is a rotatable turret which is movable with the arm from an out-of-the-way position to an in-service position disposed above the adapter. Supported on the turret is a plurality of plungers adapted to engage with the clamping members on the adapter and urge the members into clamping engagement with the fasteners. The turret is mounted so as to rotate in a plane slanted relative to the plane of rotation of the adapter so that only those clamping members located in the direction of disk rotation between the fastener-receiving station and the exit station are depressed by the plungers.

20 Claims, 9 Drawing Figures

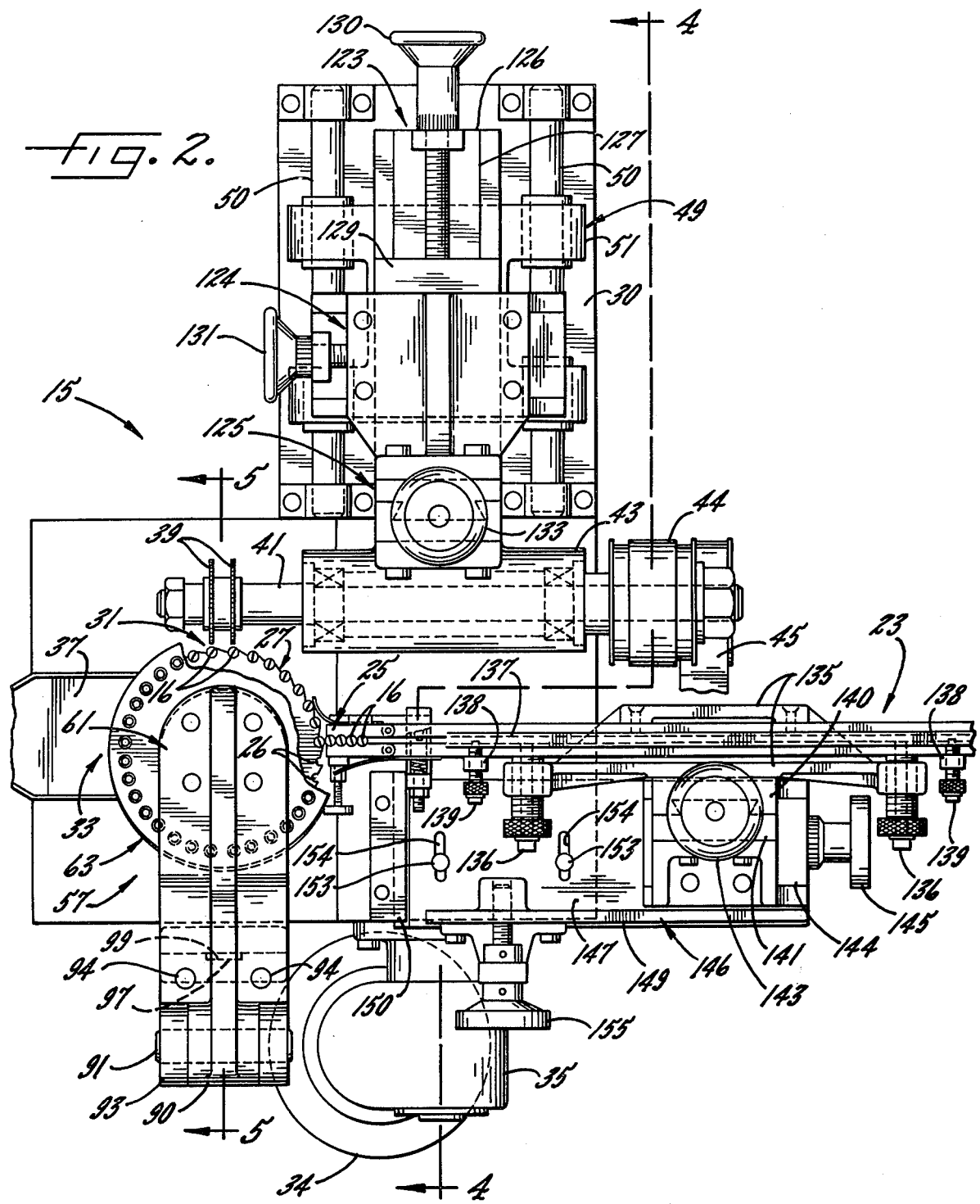

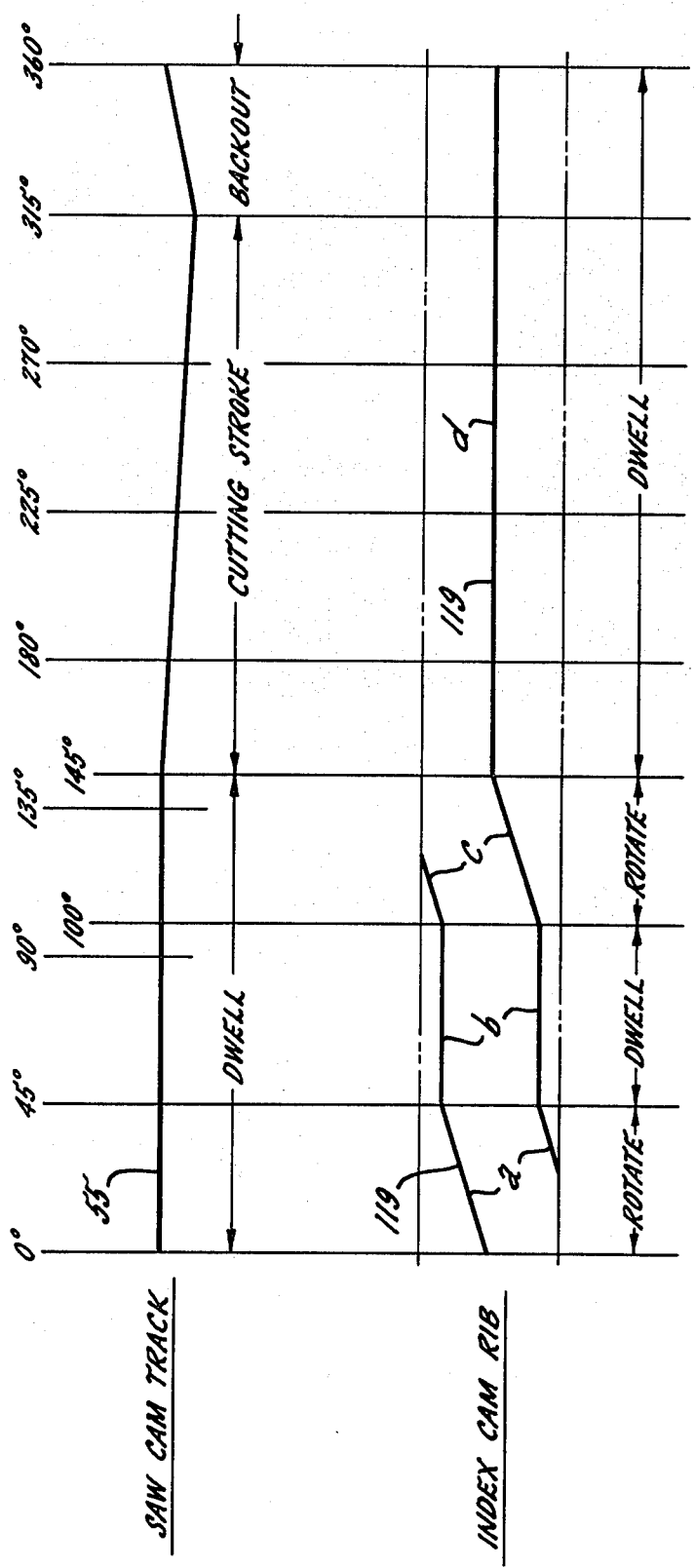

MACHINE FOR CUTTING SLOTS IN SCREW SHANKS

BACKGROUND OF THE INVENTION

This invention relates to a machine of the type in which an article is fed onto a rotatable disk traveling along a predetermined path through a work station where work may be performed on the article. More particularly, the invention relates to a machine which is adapted for use in cutting slots in the shanks of screws to form self-tapping screws. In operation of one machine of the foregoing type, the screws are advanced from a fastener-receiving station and through the work or slotting station by intermittently rotating the disk carrying the screws. While the screws to be slotted are clamped to the disk at the slotting station, rotating saws are advanced from their retracted positions during a dwell period of the machine and engage and cut slots in the shanks of the screws. After the slots are cut, the screws are moved from the slotting station by the intermittent motion of the disk to an exit station where the screws are allowed to fall by gravity down an exit chute and into a container.

SUMMARY OF THE INVENTION

The primary object of the present invention is to provide a new and improved shank slotting machine of the above general character having a substantially increased production speed over prior similar intermittent motion shank slotters and which is simpler in construction, allowing easier and quicker conversion of the machine for slotting different sizes of screws. A more detailed object is to accomplish the foregoing through the provision of a unique clamping mechanism with parts particularly adapted for movement between an in-service position for clamping screws to the screw-carrying disk and an out-of-the-way position, enabling the disk to be removed easily and quickly when converting the machine to handle differently sized screws.

The invention also resides in the provision of a unique turret and novel adapter as parts of the clamping mechanism and in the novel mounting arrangement by way of which the turret and the adapter are supported separately with respect to each other in the machine so as to nest together to rotate with the disk and to clamp the screws to the disk. More specifically, the invention resides in the novel manner in which the turret is inclined with respect to the adapter so that the parts of the turret nest with parts of the adapter to urge the latter parts into clamping engagement with the screws being carried by the disk.

An additional object of the present invention is to provide a unique arrangement at the lower end of the feed ramp to keep the screws being fed onto the disk from jamming between the ramp and the disk and to assure that the screws are seated properly on the dial prior to being clamped in place. In this regard, the invention also resides in the provision of a lower end portion of the feed ramp which uniquely is adapted to pivot in the direction of rotation of the disk to keep screws from being jammed between the end of the ramp and the disk.

Still further, the invention resides in the novel construction of the lower end portion of the feed ramp for limiting the pivotal movement of the ramp and in the unique arrangement whereby the distance between the spaced guide rails forming the lower end portion of the ramp is kept substantially the same during pivoting to avoid loosing screws from between the guide rails and the rails may be adjusted with respect to each other to accommodate different sizes of screws.

These and other objects and advantages of the present invention will become a more apparent from the following detailed description when taken in conjunction with the accompanying drawings.

BRIEF DESCRIPTION OF THE DRAWINGS

FIG. 2 is an enlarged, fragmentary view taken substantially along line 2—2 of FIG. 1.

FIG. 9 is a chart showing the cam cycles for the saw cam and the index cam in the exemplary machine.

DETAILED DESCRIPTION OF THE PREFERRED EMBODIMENT

Figures 1, 3:
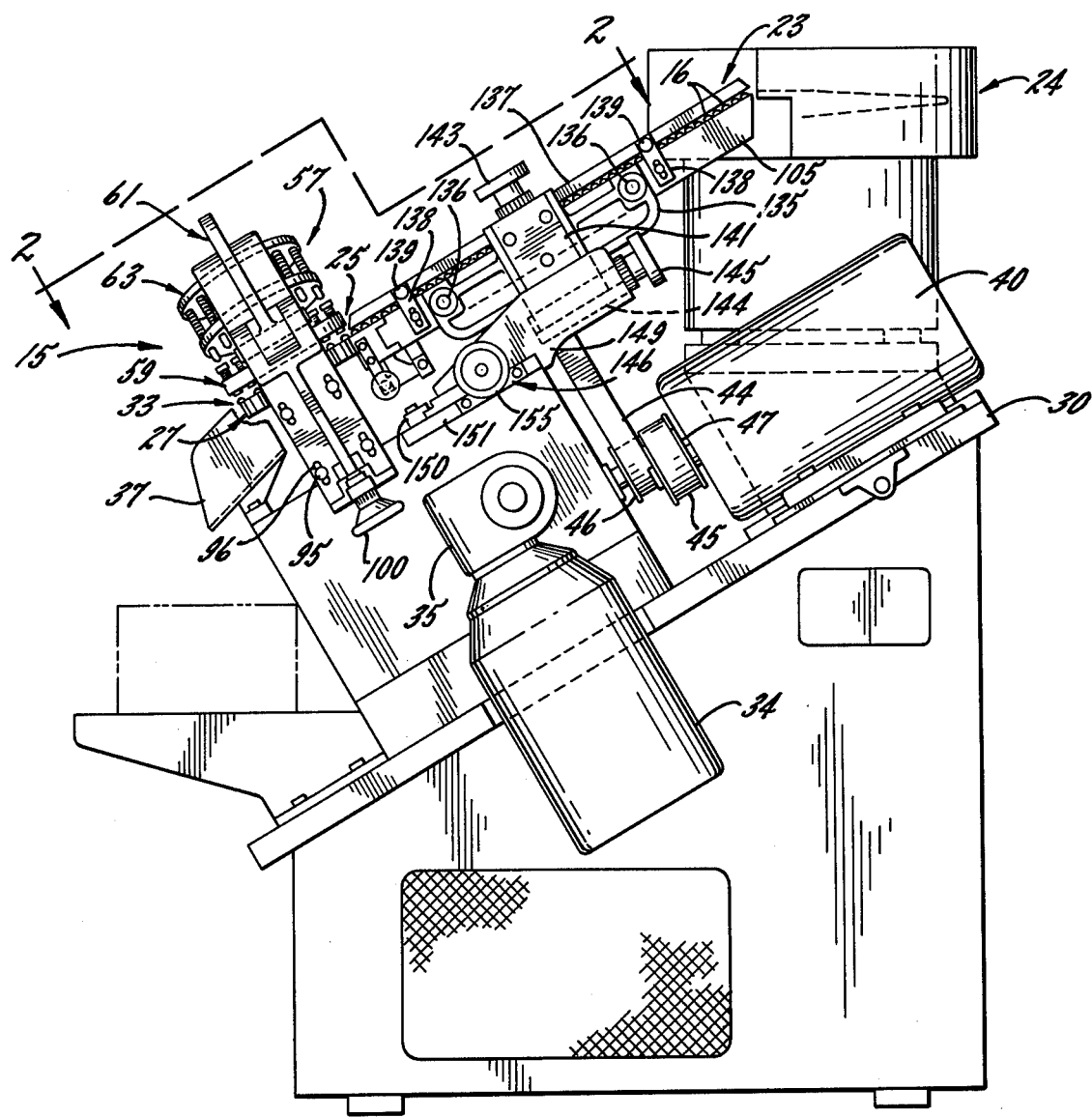
FIG. 1 is an elevational view of a shank slotting machine embodying the novel features of the present invention.
FIG. 3 is a perspective view of a self-tapping screw such as may be made using the exemplary machine.

As shown in the drawings for purposes of illustration, the present invention is embodied in a machine 15 particularly adapted for cutting slots in screws to form self-tapping screws. A typical self-tapping screw 16 formed through operation of the exemplary machine is shown in FIG. 3 and includes an enlarged head 17 with a threaded shank 19 depending therefrom. An arcuate slot 20 is formed in the lower end portion of the shank by the machine with the trailing edge 21 of the slot providing the cutting edge by way of which threads are tapped in a workpiece (not shown) as the screw is tightened in place.

Figure 4:
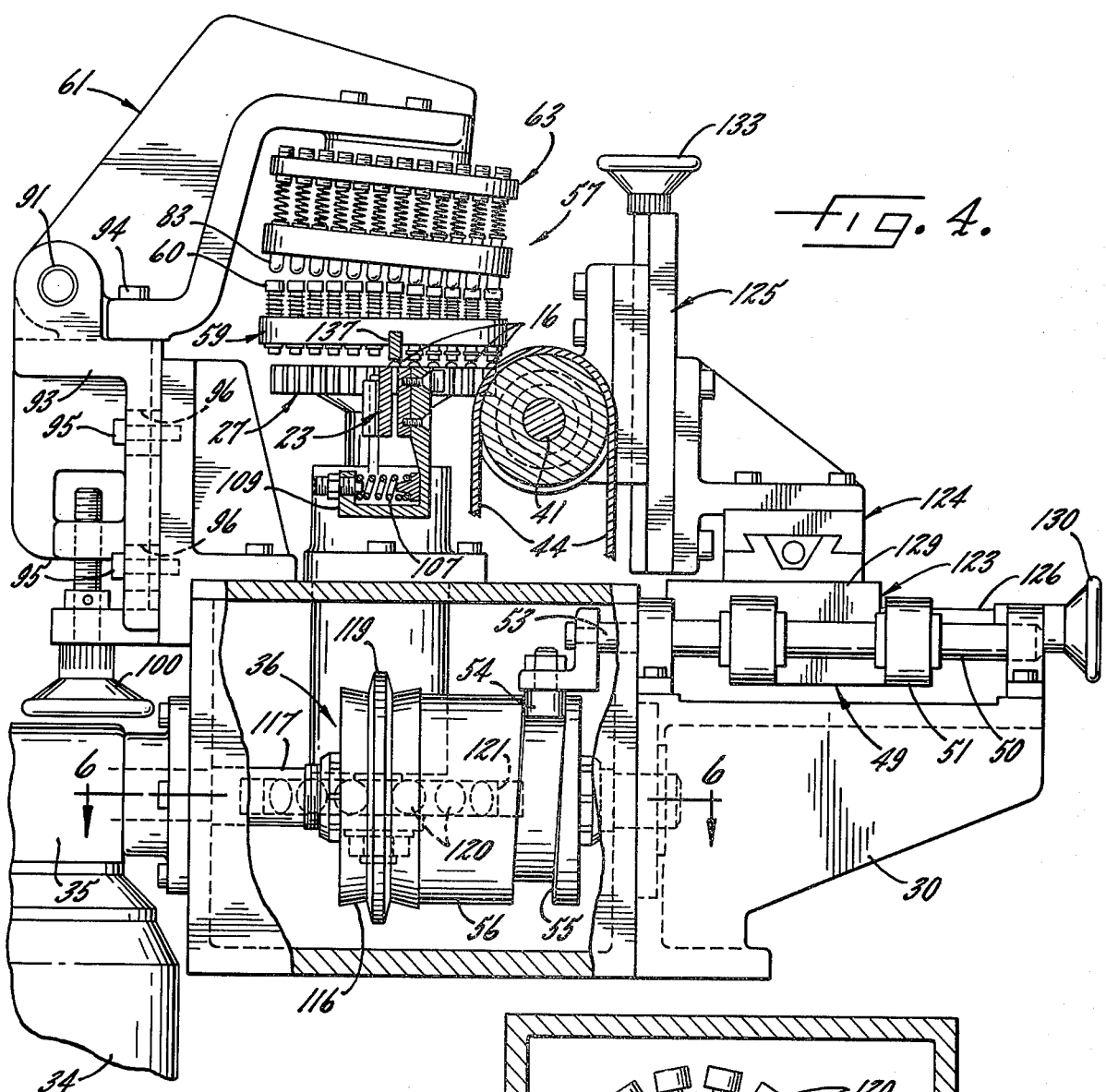
FIG. 4 is a fragmentary, cross-sectional view taken substantially along line 4—4 of FIG. 2.

To cut slots 20 in the threaded shanks 19 of the screws 16 to produce the self-tapping feature, the screws are fed one at a time down an inclined feed ramp 23 from a vibratory feeder 24 to a screw-receiving station 25 in the machine 15. At the screw-receiving station, the screws are fed one at a time from the end of the ramp into notches 26 (see FIG. 2) formed in the periphery of a disk 27. The latter is rotatable with a support shaft 29 (FIG. 5) attached to the frame 30 of the machine to carry the screws in a circular path from the screw-receiving station through a slotting station 31 and to an exit station 33 located diametrically from the receiving station. As shown in FIGS. 1, 2 and 4, a motor 34 is connected to the shaft 29 through a reducer 35 and indexing means 36 to rotate the shaft with an intermittent motion. The disk is suitably keyed to rotate with the shaft within a plane slanted at approximately 30° relative to horizontal as is shown in FIG. 1 so that the screw-receiving station 25 is located above the exit station. Accordingly, as the slotted screws 16 enter the exit station, they are permitted to fall by gravity from the notches 26 of the disk 27 and onto a chute 37, guiding the screws into a suitable container.

At the slotting station 31, two circular saws 39 (see FIG. 2) are advanced from a retracted position to cut slots 20 simultaneously in the shanks 19 of two screws 16 during a dwell period of the machine 15. A drive motor 40 (see FIG. 1) for the saws is mounted on the frame 30 of the machine below the feed ramp 23 and is connected to a spindle 41 journaled within a housing 43. Two belts 44 and 45 drivingly connect the motor 40 with the spindle to rotate the latter within the housing. Herein, the belt 45 is trained from around an idler sprocket 46 located between the spindle and the motor to a motor shaft pulley 47 while the belt 44 is connected between the spindle and the idler sprocket. A suitable take-up sprocket (not shown) is connected with the belt 44 to take up belt slack as the spindle is adjusted in position such as for cutting different sizes of screws.

To move the saws 39 between their advanced and retracted positions, the spindle housing 43 is fastened to a carriage 49 slidable on the frame 30 of the machine 15 to move the saws in a generally radial direction relative to the disk 27. More particularly, the carriage (see FIGS. 2 and 4) is supported for such sliding movement on two spaced, parallel guide rods 50 by an H-shaped base 51 whose legs are telescoped onto the guide rods. Extending forwardly from the center portion of the base and beneath the spindle housing is a connector rod 53 having a cam follower 54 journaled on the outer end thereof. The follower seats within a groove 55 of a rotatable barrel cam 56 in the indexing means 36. The cam, of course, is shaped so that the carriage remains retracted as the disk is being advanced to locate two screws 16 in the slotting station 31 and so that the carriage is advanced and retracted during the dwell period of the machine for the saws 39 to cut the slots 20 in the screws.

In accordance with the primary aspect of the present invention, a new and improved mechanism 57 for clamping the fasteners or screws 16 to the disk 27 enables the machine 15 to be operated at higher production speeds and, further, enables the machine to be converted to handle different sizes of fasteners more easily and quickly than is possible with prior similar shank slotters. For these purposes, the clamping mechanism includes an adapter 59 supported above the disk 27 and including clamping members 60 movable toward and away from the disk to clamp and release the fasteners on the disk. Mounted on a support 61 above the adapter is an actuator 63 movable on the frame 30 of the machine with the support between an out-of-the-way position and an in-service position. In the latter position, the actuator engages the clamping members of the adapter as they are moved between the fastener-receiving and exit stations 25 and 33 and urges the members toward the disk thereby clamping the fasteners to the disk as they are transported by the disk from the fastener-receiving station. Advantageously, this construction avoids the use of dwell period time in clamping down the fasteners just prior to slotting. Moreover, with the fasteners being clamped to the disk upon leaving the fastener-receiving station, the operating speed of the machine is increased further by enabling the disk to be rotated faster without the fasteners being thrown off the disk. Still further, by virtue of being able to move the actuator into its out-of-the-way position, the disk may be removed from the machine and replaced quickly and easily with another disk for slotting fasteners of a different size.

In the present instance, the adapter 59 (see FIGS. 4 and 5) comprises a metal plate having an inverted, generally frusto-conical center section 64 and a substantially radial peripheral lip 65 integrally formed with the center section. The plate 59 is telescoped onto the shaft 29 with the latter extending upwardly through a central hole 66 in the plate so that the plate is supported axially on the shaft by the disk 27. A threaded upper end portion 67 of the shaft projects upwardly beyond the upper surface of the plate for receiving a nut 69 to secure the plate on the shaft. Herein, the adapter plate is keyed on the shaft with the clamping members 60 aligned in an axial direction with respect to the notches 26 formed in the periphery of the disk, one clamping member for each notch.

Figure 5:
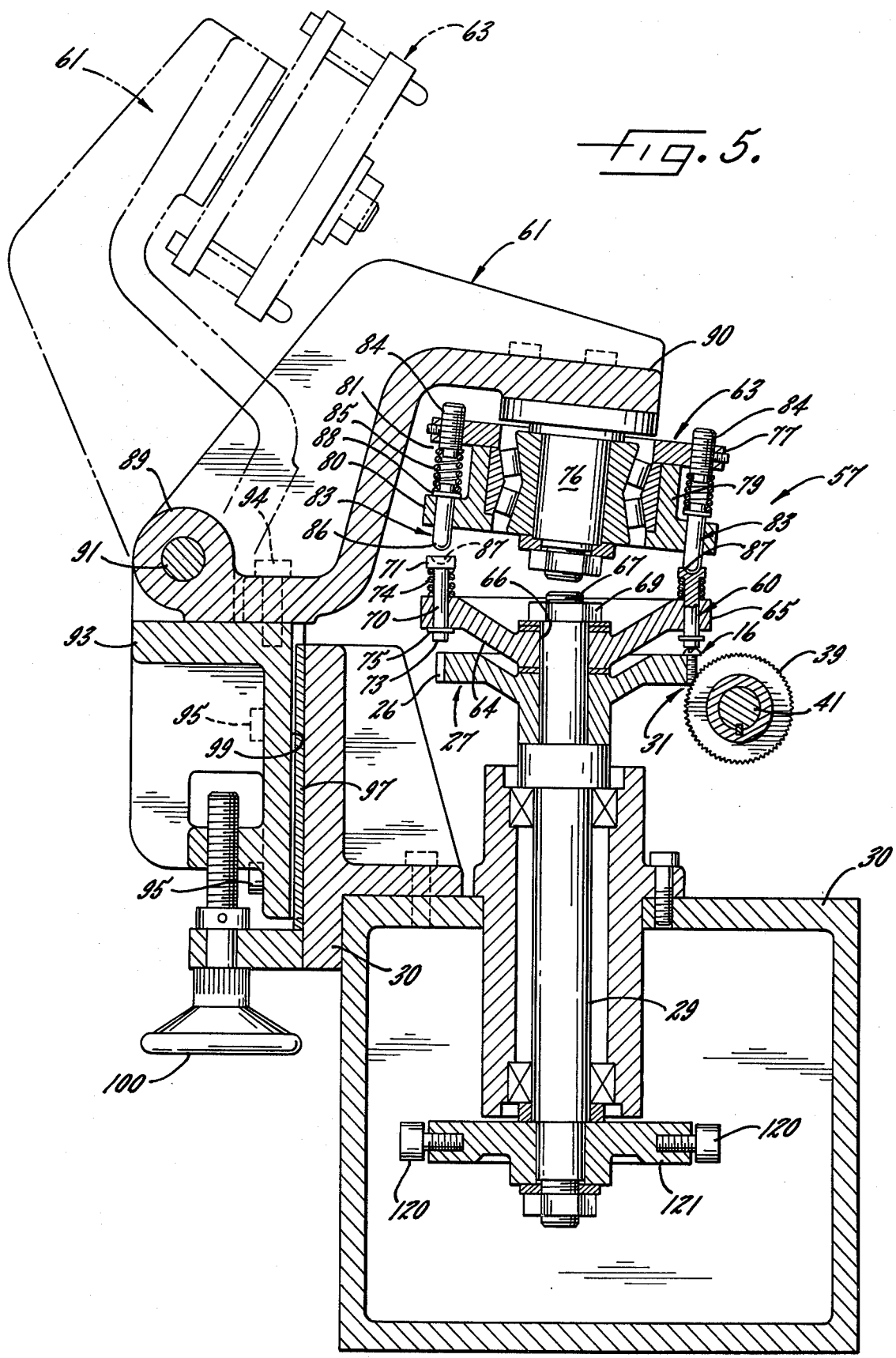
FIG. 5 is an enlarged, cross-sectional view taken substantially along line 5—5 of FIG. 2 with parts of the machine being shown in phantom in moved positions.

As shown in FIG. 5, the clamping members 60 are mounted slidably on the adapter plate 59 within the peripheral lip 65. In particular, each clamping member comprises a generally cylindrical rod 70 telescoped through the lip with an enlarged head 71 disposed adjacent the side of the plate opposite the disk 27 and a lower end portion 73 disposed adjacent the side of the plate facing the disk. A coil spring 74 is telescoped onto the rod and acts between the enlarged head and the upper surface of the plate normally urging the lower end portion of the rod axially away from the disk notches 26. To keep the rod from sliding axially out of the lip, a clip ring 75 is secured to the lower end portion of the rod to normally engage with the underside of the lip.

To move the clamping members 60 axially toward the disk 27 to clamp the fasteners or screws 16 in the notches 26, the actuator 63 comprises a turret journaled on a stub shaft 76 projecting in a generally downward direction from the support 61 and toward the adapter plate 59 when the actuator is in its in-service position. More particularly, the turret comprises an upper ring 77 and a smaller diameter collar 79 both of which are telescoped onto the stub shaft with the upper end of the collar abutting with and being secured to the underside of the ring. Integrally formed with the lower end portion of the collar is a flange 80 projecting radially outward therefrom to define an annular space 81 between the radially outward portion of the ring and the flange. Projecting through the peripheral portion of the ring, the annular space and the flange 80 are a plurality of reciprocable plungers 83 corresponding in number to the number of clamping members 60. Each of the plungers includes a threaded upper section 84 secured in the peripheral portion of the ring 77 and extending partially into the annular space 81. Engaging the lower end of the upper section is an intermediate coil spring 85 which is sandwiched between the upper section and a lower section 86 so as to urge the lower section in a downward axial direction relative to the stub shaft 76 and toward one of the clamping members 60. A radial rib 88 extending outwardly from adjacent the upper end of the lower section engages the upper surface of the flange to retain the lower section of the plunger on the turret. By virtue of the foregoing construction, it will be appreciated that the strength of the force with which the lower section is urged downwardly is adjustable by turning the upper section 84 to move either toward or away from the lower section.

Advantageously, to actuate only those clamping members 60 which are located between the screw-receiving and exit stations 25 and 33 during operation of the machine 15, the turret 63 in its in-service position is mounted on the stub shaft 76 to rotate in a slanted plane converging upon the plane of rotation of the adapter plate 59 upon progressing toward the slotting station 31 from the axis of rotation of the plate. At the side of the turret opposite the slotting station, the lower end portions 86 of the plungers 83 are spaced vertically from the rod heads 71 of the clamping members 60. On the other side of the turret, the plungers engage the rods, overcoming the springs 74 and urging the rods downwardly to clamp the screws against the disk. In this way, the screws are held securely to the disk 27 both for slotting purposes and so the disk may be turned more rapidly without the screws being thrown off by centrifugal force. Moreover, it will be appreciated that by slanting the plane of rotation of the turret relative to the plane of rotation of the adapter, and with the exit station 33 spaced diametrically from the screw-receiving station 25, the plungers disengage from the clamping members upon approaching the exit station thereby releasing the recently slotted screws and allowing them to drop by gravity into the exit chute 37. Still further, to assure that the turret and adapter rotate together, the lower sections 86 of the plungers are rounded to nest within corresponding recesses 87 formed in the heads 71 of the clamping rods 70. Accordingly, as the adapter is rotated with the shaft 29 the turret is turned with the adapter by virtue of the nesting connection between the plungers and clamping rods on the slotting station side of the turret.

To aid in changing disks 27 in the machine 15 for slotting different sizes of screws 16, the support 61 is in the form of an arm having a free end portion 90 and an opposite end 89 pivotally secured to the frame 30 of the machine by a pivot pin 91. Attached to the free end portion of the arm is the stub shaft 76 upon which the turret 63 is journaled at the pivotal connection of the arm with the frame, the pivot pin is located between the lower end of the arm 61 and a slide bracket 93. The latter is adjustable in a generally vertical direction on the frame for adjustment of the distance between the turret 63 and the adapter plate 59 for proper seating of the plungers 83 with the clamping members 60. Normally, the arm 61 is locked in its in-service position by screws 94 extending through the arm and into the bracket (see FIG. 5). When it is desired to change the disk 27 so the machine 15 may handle different sizes of screws 26, the screws 94 may be removed from between the arm and the bracket so that the arm may be pivoted upwardly into its out-of-the-way position as is shown in phantom in FIG. 5. Then, the disk 27 may be removed easily from the shaft 29 by simply unthreading the retaining nut 69 from the upper end 67 of the shaft and lifting the adapter 59 and disk from the shaft.

After replacing the disk 27 with another, the spacing between the turret 63 and the adapter 59 may be adjusted for proper seating of the plungers 83 against the clamping members 60 by selectively moving the slide bracket 93 on the frame 30 of the machine 15. As shown in FIGS. 1 and 5, the bracket is supported on the frame by four screws 95 which extend through elongated and vertically oriented slots 96. A key 97 (see FIGS. 2 and 5) attached to the frame extends into a way 99 formed in the bracket to guide the latter for generally vertical movement on the frame. Sliding movement of the bracket on the frame for selective positioning of the turret relative to the adapter is achieved by turning an adjusting knob 100. The latter is disposed below the bracket and includes a lower end portion which is secured to the frame of the machine and an upper end section which is threaded into the bracket. Accordingly, as the knob is turned one way or the other, the bracket may be slid vertically relative to the frame to adjust the spacing between the turret and the adapter so that the screws 16 are clamped to the disk upon leaving the screw-receiving station 25.

In accordance with another important aspect of the present invention, the lower end portion 101 of the feed ramp 23 is constructed in a novel fashion whereby the screws 16 are kept from jamming between the ramp and the disk 27 as the latter is indexed away from the screw-receiving station 25. For this purpose, the lower end portion is connected pivotally with the upper end portion 103 of the ramp so as to swing with the disk in the direction which the latter is rotated so that the screws are kept from wedging between the ramp and the disk. To return the lower end portion into its normal position after being moved out of place, spring means urges the lower end portion back toward its normal position from which the screw are guided properly into the disk notches 26. By virtue of this arrangement, screws are kept from being jammed between the ramp and the disk and possibly causing damage to the machine.

Figure 7:
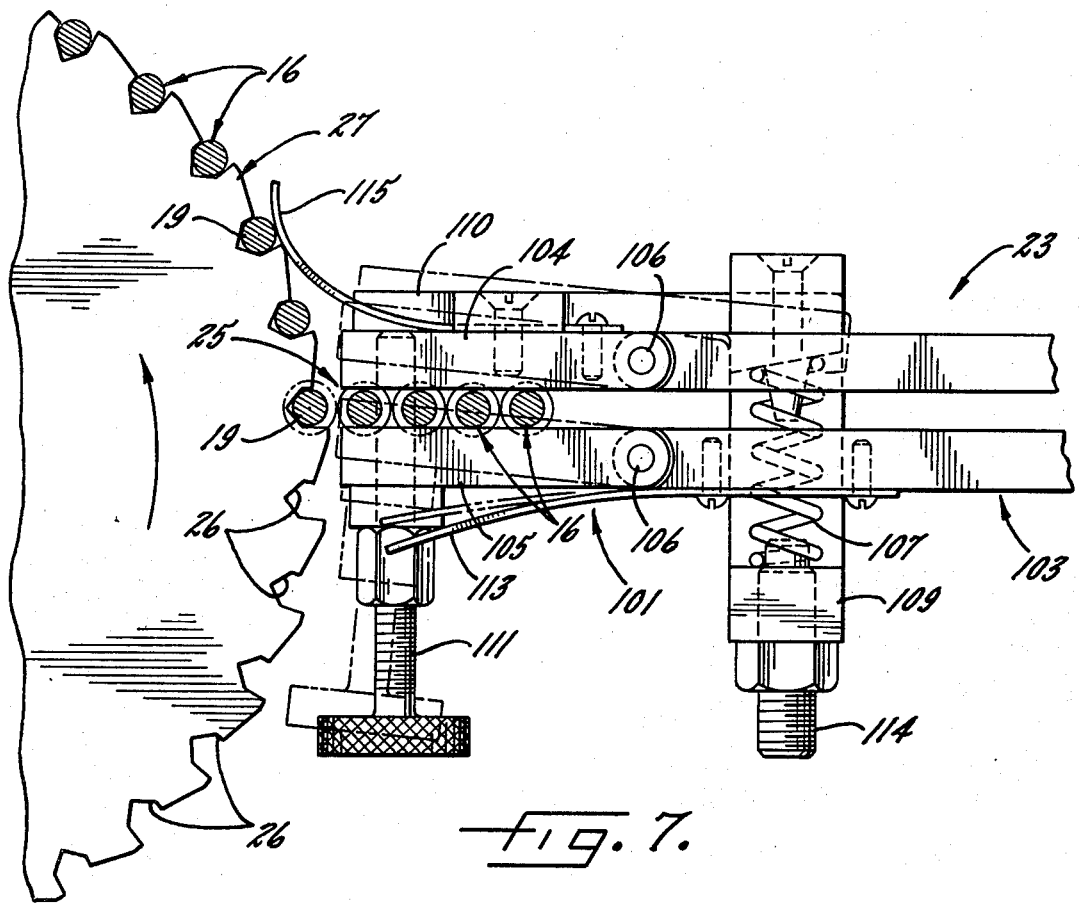
FIG. 7 is an enlarged, fragmentary view showing screws being fed from the feed ramp and onto the disk.
Figure 8:
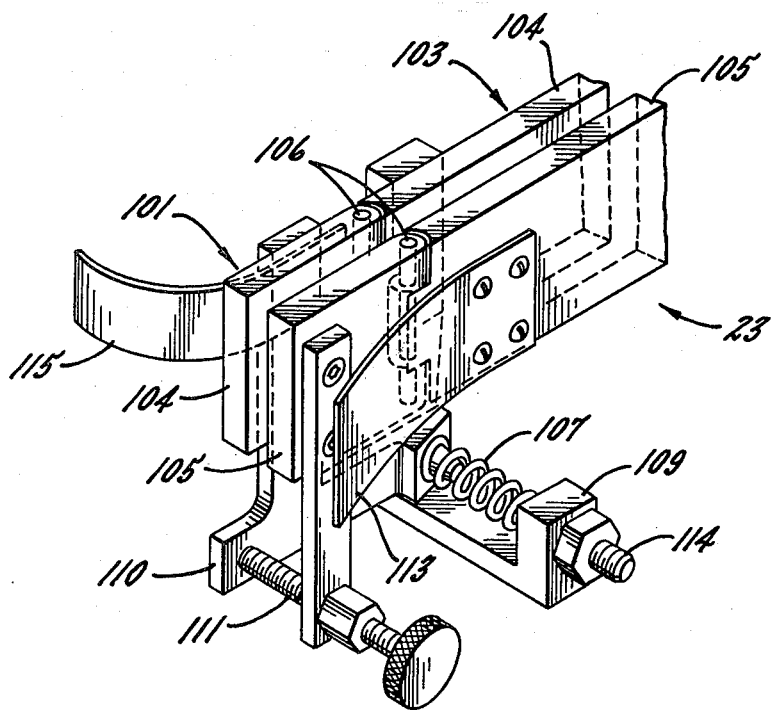
FIG. 8 is an enlarged, fragmentary, perspective view of the lower end portion of the feed ramp.

As shown in FIGS. 2, 7 and 8, the lower end portion 101 of the ramp 23 includes two parallel guide rails 104 and 105 which are spaced from each other to receive the shanks 19 of the the screws 16 as the latter are fed down the ramp from the vibratory feeder 24. Both the upstream and downstream guide rails 104 and 105 are suitably hinged to the corresponding guide rails of the upper portion 103 of the ramp by pins 106 for movement in the normal direction of rotation of the disk 27. Accordingly, should a screw fail to properly seat within one of the notches 26 in the disk, the guide rails may pivot with the disk so the screw is kept from being jammed between the rails and the disk. Moreover, by virtue of both the rails pivoting together, the screws which are located between the rails are kept from dropping from between the guide rails during pivoting.

To assure that the guide rails 104 and 105 return toward their proper positions after being pivoted with the disk 27, the aforementioned spring means includes a coil spring 107 acting between the downstream rail 104 and the upper portion 103 of the ramp 23 to urge the latter rail in a direction counter to the direction of rotation of the disk. Herein, the coil spring acts between an L-shaped bracket 109 (see FIG. 8) fastened to the upper end portion of the ramp and an inverted, T-shaped arm 110 secured to the downstream guide rail. Advantageously, the coil spring urges the lower cross portion of the arm toward engagement with the bracket so that the downstream rail normally is held in alignment with the corresponding rail in the upper end portion of the ramp. Moreover, resistance of the lower end portion to pivoting may be changed by selective adjustment of the strength of the coil spring. As shown in FIG. 8, this is achieved by way of a movable seat 114 which is threaded into the L-shaped bracket 109 for engagement with one end of the coil spring. By threading the seat to place the coil under either increased or decreased compression, the coil spring is, in effect, made stronger or weaker to vary the resistance to pivoting of the lower end portion of the ramp.

For proper spacing between the guide rails 104 and 105, an adjustment screw 111 is connected to the upstream guide rail 105 and abuts with the T-shaped arm 110 to form an adjustable stop means for setting the distance between the two guide rails to accommodate different sizes of screws 16. Urging the end of the adjustment screw toward the arm 110 is a flat spring 113 which is attached to the upper portion of the ramp and engages the upstream guide rail, urging the latter toward the downstream guide rail. With this arrangement, proper spacing is maintained between the guide rails for feeding screws into the disk notches 26 and, even during pivoting, the rails are kept spaced properly from each other so as to keep screws from dropping and possibly jamming between the rails.

Proper seating of the screws 16 within the notches 26 of the disk 27 preparatory to clamping of the screws to the disk is assured by means of another flat spring 115. As shown in FIG. 7, the spring 115 is secured to the downstream guide rail 104 of the lower end portion 101 of the feed ramp 23 and includes a slightly curled free end portion engaging the edge of the disk. By virtue of the resiliency of the spring, the screws in the notches are urged radially inward upon being rotated past the curled end of the spring. In this way, the screws are seated properly within the notches for being clamped to the disk by the clamping members 60.

In rotating the disk 27 to move from the screw-receiving station 25, through the slotting station 31 and to the exit station 33, the indexing means 36, advantageously, rotates the disk in an intermittent fashion having a first dwell period which is of substantially shorter duration than a second dwell period. During the first dwell period, one of the screws 16 from the ramp 23 is fed into one of the notches 26 of the disk while that notch is aligned with the lower end portion of the ramp. The disk is then advanced to position the next notch in alignment with the ramp for a second screw 16 to be fed onto the disk during the second and longer dwell period. Also, during the second dwell period, the saws 39 are advanced from their retracted positions to cut slots 20 in the two screws 16 positioned in the slotting station and, after cutting, are returned to their retracted positions so that two more screws may be advanced into the slotting station to be slotted. With the shorter and longer dwell periods occurring within each cycle of the machine, the two screws may be fed onto the disk more smoothly and quickly and with less likelihood of jamming in the machine.

Figure 6:
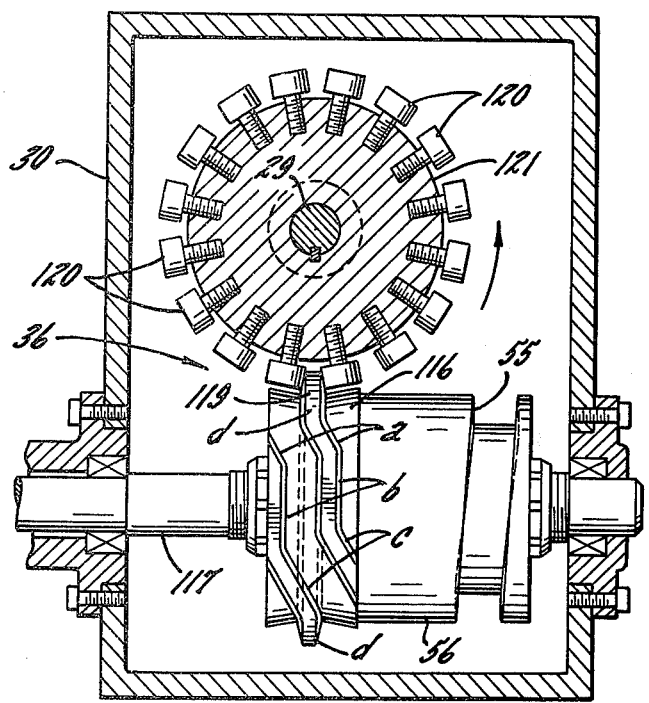
FIG. 6 is an enlarged, fragmentary, cross-sectional view taken substantially along line 6—6 of FIG. 4.

The means for indexing the disk 27 with the two dwell periods is shown more particularly in FIGS. 4 and 6 and comprises a rib cam 116 secured to the index shaft 117 leading from the reducer 35. Riding against the rib 119 of the cam are angularly spaced followers 120 extending radially outward from a wheel 121 secured to the disk supporting shaft 29. As the index shaft is rotated, the rib turns between the followers to rotate the wheel in accordance with the shape of the rib. As shown in FIG. 9, a first section $a$ of the index cam is shaped to cause the disk shaft to rotate as the cam is turned through 45° by rotation of the index shaft. At the end of the first rib section, the first dwell period is entered with a second rib section $b$ sliding between the followers on the wheel for 55° rotation of the cam while the first screw 16 is fed into one of the disk notches. Once the first dwell period is completed, the disk shaft is again turned by a third rib section $c$ as the cam is rotated through another 45° to move the first screw toward the slotting station and to move the next screw-receiving notch into alignment with the end of the ramp 23 for the second screw to be fed onto the disk. At the end of the last-mentioned period of disk movement, the second and longer dwell period is entered with a fourth and final section $d$ of the cam rib turning between the followers on the wheel without causing the wheel to turn while the cam is rotated through 215°. During this time, and by operation of the saw cam 56, the saws are advanced through a cutting stroke, 170° of the saw cam, to cut the slots in the two screws dwelling at the slotting station 31. Then, for the last 45° of the second dwell period, the saws are retracted. At the end of the second dwell period of the index mechanism, the saw cam enters a dwell period of 145° during which time the index cam repeats the first portion of its cycle.

To adjust the position of the saws 39 for slotting different sizes of screws 16 and for positioning the saws accurately within the slotting station 31, the saw carriage 49 is adjustable to position the saws in directions extending radially, tangentially and axially relative to the disk 27. As shown in FIGS. 2 and 4, the saw carriage includes three carriers 123, 124 and 125 each mounted on top of the next for adjusting the saws in the aforementioned radial, tangential and axial directions, respectively. Herein, the radial carrier 123 includes a base 126 secured to the saw carriage base 51 and having a dove-tail projection 127 integrally formed therewith to mate with a dove-tail way (not shown) formed in the base 129 of the tangential carrier 124. In a similar manner, the tangential carrier is mounted on the radial carrier, and the axial carrier is mounted on the tangential carrier. Adjusting screws 130, 131 and 133, provide for fine adjustment in the positions of the carriers 123, 124 and 125, respectively, relative to the disk for locating the saws 39 precisely as desired for slotting screws of different sizes.

Other adjustment mechanisms also are provided for adjusting the position of the feed ramp 23 in radial, tangential and axial directions relative to the disk 27 and for adjusting the width of the space between the guide rails of the ramp for different sizes of screws 16. Herein, the downstream guide rail (see FIG. 2) of the upper portion of the ramp 23 is secured to a bracket 135 which extends along one side thereof. The upstream guide rail is connected to the opposite side of the bracket by means of adjusting screws 136 which enable the latter guide rail to be moved either toward or away from the downstream rail to change the width of the space between the rails as may be required for screws having different shank diameters. An elongated cap plate 137 for keeping the screws from stacking in the feed ramp extends along the length of the space and is adjustable laterally relative to the space by support screws 139 so as to remain centered over the space as the upstream rail is moved either toward or away from the downstream rail. As shown in FIG. 1, the screws are carried on slidable brackets 138 attached to the upper end portion of the ramp for moving the cap plate selectively toward and away from the ramp to accommodate screws having different thickness of heads.

For adjusting the feed ramp 23 in an axial direction relative to the disk 27, a dove-tail way 140 (see FIG. 2) is secured to the bracket 135 and mates with a correspondingly shaped slide 141. An adjustment knob 143 connected to the slide may be turned in clockwise and counterclockwise directions to move the ramp in an axial direction on the slide. In a similar manner, a radial slide 144 is connected with a way formed in the axial slide and an adjustment knob 145 may be turned to adjust the position of the ramp in a radial direction relative to the disk. Supporting the radial slide on the frame 30 of the machine 15 is a tangential carrier 146 having a bottom plate 147 with an upright side 149 integrally formed with one edge thereof. The radial slide is attached to one end of the bottom plate while the other end of the plate is held by a clamp 150 on a wear plate 151 which, in turn, is secured to the frame. Screws 153 extending through elongated slots 154 (see FIG. 2) in the bottom plate secure the latter to the wear plate and an adjusting screw 155 acting between the wear plate and the bottom plate serves to move the tangential carrier for positioning the feed ramp 33 relative to the disk 27.

In view of the foregoing, it will be appreciated that the present invention brings to the art a new and improved shank slotting machine 15 in which the unique clamping mechanism 57 enables the machine to be converted more quickly and easily for slotting different sizes of screws 16 and which enables the machine to be operated at a much higher rate of speed to substantially increase the production capacity of such machine. In particular, the adapter 59 in the clamping mechanism is mounted on the shaft 29 with the screw-carrying disk 27 but the actuator 63 is mounted separately on the pivotal arm 61 which may be swung into an out-of-the-way position for changing the disk so the machine may handle different sizes of screws. Moreover, the clamping members 60 of the adapter serve to clamp the screws to the disk between the screw-receiving station 25 and the exit station 33 to enable the disk to be rotated faster without the screws being thrown off. Still further, the unique lower end portion 101 of the feed ramp 23 is pivotal with respect to the upper end portion 103 to keep screws from becoming jammed between the disk and the ramp.

I claim:

1. A machine for forming slots in the shanks of fasteners comprising a frame, a fastener-carrying disk mounted on said frame, indexing means connecting with said disk to move the latter intermittently along a predetermined path through spaced fastener-receiving, slotting and exit stations, cutting means at said slotting station for forming slots in the fasteners during a dwell period, feed means at said fastener-receiving station for directing the fasteners onto said disk, and clamping mechanism supported by said frame for holding the fasteners on said disk as the latter is rotated along said path from said receiving station, through said slotting station and to said exit station, said mechanism including a support mounted on said frame for movement between an in-service position and an out-of-the-way position, an actuator attached to said support and being movable bodily therewith, said actuator being spaced a predetermined distance from said disk when said support is in its in-service position, an adapter connected with said disk for bodily rotation therewith and being located between said actuator and said disk, clamping members carried on said adapter and being movable relative to said adapter toward and away from said disk for clamping said fasteners on said disk as the fasteners are carried along said path and through said slotting station, said actuator engaging said members as they are moved between said receiving and exit stations to urge said members toward said disk to clamp the fasteners on said disk as the latter is being moved and while the fasteners are being slotted, said actuator comprising a turret journaled on said free portion of said arm, said turret including a plurality of plungers slidably supported thereon and projecting in a generally axial direction relative to said turret urging said plungers resiliently toward said adapter, said adapter including a plurality of clamping rods slidably mounted thereon and projecting therefrom in a generally axial direction relative to said adapter and toward said disk, said rods being engaged by said plungers between said fastener-receiving and exit stations to connect said turret for bodily rotation with said adapter and to urge said rods toward said disk thereby clamping the fasteners to said disk.

2. A machine as defined in claim 1 including a slide bracket connected between said one end portion of said arm and said frame, said bracket being slidable on said frame and carrying said arm to adjust selectively the distance between said turret and said adapter.

3. A machine as defined by claim 1 wherein said turret rotates in a plane slanted relative to the rotational plane adapter so the plungers on the side of the turret opposite the slotting station are spaced from the rods on the corresponding side of said adapter and so the plungers on the side of the turret adjacent the slotting station nest with the rods on the like side of the adapter to urge the rods toward the disk thereby clamping the fasteners to said disk and connecting the turret and adapter together so the turret rotates with the adapter.

4. A machine as defined by claim 3 wherein each of said plungers includes an upper section threaded into said turret, a lower section telescoped slidably through said turret, and an intermediate coil spring connected between said upper and lower sections and urging said lower section away from said upper section, said upper section being adjustable in an axial direction toward and away from said lower section to vary the force with which said spring urges said lower section away from said upper section.

5. A machine as defined by claim 4 wherein said lower section includes a rounded lower end of predetermined diameter, each of said clamping rods on said adapter having an enlarged head facing toward said turret, a recess formed in said head and having a diameter larger than said predetermined diameter to receive the rounded lower end of one of said plungers, a coil spring telescoped over said rod between said head and said adapter and urging said rod in an upward direction for said plungers and said rods to nest together.

6. A machine as defined by claim 3 wherein said disk includes a plurality of notches formed in the periphery thereof for receiving said fasteners, said machine further including a flat spring having one end attached to said feed means and a free end engaging said disk between said fastener-receiving said slotting stations to urge said fasteners into said notches.

7. A machine as defined by claim 2 wherein said feed means comprises a ramp extending upwardly and away from said disk at said fastener-receiving station, said ramp including an upper end portion and a lower end portion pivotally connected with said upper end portion to swing in the direction of rotation of said disk to keep said fasteners from being jammed between said disk and said ramp adjacent said fastener-receiving station, spring means acting against said lower end portion and urging the latter in a direction opposite the direction of rotation of said disk.

8. A machine as defined by claim 7 wherein said lower end portion of said ramp includes an upstream guide rail and a downstream guide rail, said guide rails being spaced parallel with each other and being connected pivotally to the upper end portion of said ramp, said spring means including a first spring connected between said upper end portion and said upstream guide rail and urging the latter toward said downstream guide rail, a second spring connected between said upper end portion and said downstream guide rail and urging the latter toward said upstream guide rail, stop means fastened to one of said guide rails and engaging the other of said guide rails to keep said rails parallel with each other.

9. A machine as defined by claim 8 including means for selectively adjusting the strength of said second spring.

10. A machine as defined by claim 7 wherein said indexing means is further adapted for rotating said disk with an intermittent motion having a first dwell period and a second dwell period substantially longer than said first dwell period.

11. A machine as defined by claim 10 wherein said cutting means includes first and second saws movable relative to said disk during said second dwell period to cut slots in two of the fasteners.

12. A machine for forming slots in the shanks of fasteners comprising, a frame, a rotatable shaft mounted on said frame, a fastener-carrying disk secured on said shaft indexing means connected with said shaft for rotating said disk intermittently through spaced fastener-receiving slotting and exit stations, cutting means at said slotting station for forming slots in the fasteners during the dwell period of said machine, feed means at said fasteners-receiving station for directing said fasteners onto said disk and clamping mechanism supported by said frame for holding the fasteners on said disk as the latter is rotated from said fastener-receiving station, through said slotting station and to said exit station, said mechanism including an arm having one end portion connected to said frame and an opposite free end portion, said arm being pivotal on said frame relative to said disk to swing said free end portion between an in-service position disposed above said disk and an out-of-the-way position, a turret journaled on said free end portion, a plurality of plungers mounted on said turret and being urged in a generally axial direction from said turret and toward said disk when said arm is in its in-service position, an adapter secured to said shaft above said disk and below said turret and including a plurality of clamping members attached thereto and being urged from said disk in a generally axial direction relative to said shaft, said turret being rotatable within a plane slanted downwardly toward said slotting station from the free end of said arm when the latter is in its in-service position, said plungers engaging with said clamping members when the latter are located between said fastener-receiving and exit stations to connect said turret with said adapter so said turret bodily therewith, said plungers also urging said clamping members toward said disk to clamp the fasteners against said disk during slotting of the fasteners and as the disk is rotated from said fastener-receiving station, through said slotting station to said exit station.

13. A machine for forming slots in the shanks of fasteners comprising, a frame, rotatable shaft mounted on said frame, a fastener-carrying disk secured on said shaft and including a plurality of fastener-receiving notches formed in the periphery thereof, indexing means connected with said shaft for rotating said disk through spaced fastener-receiving, slotting and exit stations, and indexing means rotating said shaft with an intermittent motion having a first dwell period and a second dwell period of substantially longer duration than said first dwell period, cutting means at said slotting station for forming slots in two fasteners at substantially the same time during said second dwell period, feed means at said fastener-receiving station for directing fasteners into said notches during both said first and second dwell periods, said feed means including a ramp extending upwardly and away from said disk at said fastener-receiving station, said ramp including an upper end portion and a lower end portion pivotally connected with said upper end portion to swing in the direction of rotation of said disk to keep said fasteners from being jammed between said disk and said ramp, a spring acting against said lower end portion and urging the latter in a direction opposite the direction of rotation of said disk, and clamping mechanism supported by said frame for holding the fasteners on said disk as the latter is rotated from said fastener-receiving station, through said slotting station and to said exit station, said mechanism including an arm having one end portion connected to said frame and an opposite free end portion, said arm being pivotal on said frame relative to said disk to swing said free end portion between an in-service position disposed above said disk and an out-of-the-way position, a turret journaled on said free end portion and being freely rotatable relative to said arm, a plurality of plungers mounted on said turret and extending in an axial direction relative thereto, springs associated with said plungers and urging the latter toward said disk when said arm is in its in-service position, an adapter plate secured to said shaft above said disk and below said turret and including a plurality of clamping rods attached thereto and extending toward said disk in an axial direction relative to said shaft, springs connected to said rods and urging the latter away from said disk, said turret being rotatable within a plane slanted downwardly toward said slotting station from the free end of said arm when the latter is in its in-service position, said plungers having lower end portions nesting with the upper end portions of said rods when the latter are located between said fastener-receiving and exit stations and urging said rods toward said disk to clamp said fastener against said disk and within said notches and to connect said turret with said adapter plate so said turret rotates bodily with said adapter.

14. In a machine for performing work on a plurality of articles, the combination of, a frame, a disk mounted on said frame for carrying the articles, means connected with said disk to rotate the latter along a predetermined path from an article-receiving station and through a work station, means at said work station for performing work on the articles carried by said disk, and feed means at said article-receiving station for directing the article onto said disk, the improvement in said machine comprising, clamping mechanism supported by said frame for holding the articles on said disk as the latter is rotated through said work station, said mechanism including a support mounted on said frame for movement between an in-service position and an out-of-the-way position, an actuator attached to said support and being movable bodily therewith, said actuator being spaced a predetermined distance from said disk when said support is in its in-service position, and adaptor connected with said disk for bodily rotation therewith and being located between said actuator and said disk, clamping members carried on said adaptor and being movable relative to said adapter toward and away from said disk for clamping said articles on said disk as the articles are carried along said path through said work station, said actuator engaging said members as the disk is rotated from said article-receiving station and toward said work station to urge said members toward said disk thereby clamp the articles on said disk as the latter is being moved.

15. In a machine for performing work on a plurality of articles, the combination of, a frame, a disk mounted on said frame for carrying the articles, means connected with said disk to rotate the latter along a predetermined path from an article-receiving station and through a work station, means at said work station for performing work on the articles carried by said disk, and feed means at said article-receiving station for directing the articles onto said disk, the improvement in said machine comprising, clamping mechanism supported by said frame for holding the articles on said disk as the latter is rotated through said work station, said mechanism including an adapter spaced above and connected with said disk for bodily rotation therewith, a plurality of clamping members carried on said adapter and being movable toward and away from said disk for clamping said articles on said disk as the articles are carried along said path through said work station, an arm having one end portion pivotally connected to said frame and an opposite free end portion, said arm being movable from an out-of-the-way position to an in-service position with said free end disposed above said adapter, a turret journaled on the free end of said arm and having a plurality of plungers mounted thereon and extending axially toward said adapter when said arm is in its in-service position, said turret being journaled on said arm to rotate in a plane slanted relative to the rotational plane of said adapter so the plungers on the side of the turret opposite the work station are spaced from said clamping members on the corresponding side of the adapter and the plungers on the side of the turret adjacent the work station nest with the clamping members on the like side of the adapter to urge the members toward the disk so as to clamp the articles to the disk and so as to connect turret and adapter together whereby the turret rotates with the adapter.

16. In a machine for performing work on a plurality of articles, the combination of, a frame, a disk mounted on said frame for carrying the articles, means connected with said disk to rotate the latter along a predetermined path from an article-receiving station and through a work station, means at said work station for performing work on the articles carried by said disk, and a feed ramp extending upwardly and away from said article-receiving station for directing the articles onto said disk, the improvement in said machine comprising, and upper end portion of said feed ramp and a lower end portion of said feed ramp having two spaced, parallel guide rails pivotally connected to said upper end portion in upstream and downstream positions relative to each other and to the direction of rotation of said disk, a first spring connected between said upper end portion and said upstream guide rail and urging the latter toward said downstream guide rail, a second spring connected between said upper end portion and said downstream guide rail and urging the latter toward said upstream guide rail, stop means fastened to one of said guide rails and engaging the other of said guide rails to keep said rails parallel with each other whereby said lower end portion of said ramp may be swung in the direction of rotation of said disk to keep said articles from being jammed between said disk and said ramp as said disk carries said articles away from said article-receiving station.

17. In a machine for performing work on fasteners of the type having a head and a shank, the machine including a frame, a disk having a plurality of fastener receiving recesses at its periphery, means connected to the disk to rotate the disk through spaced fastener receiving, work and exit stations, and a fastener feed ramp for feeding fasteners to the recesses in the disk at the fastener receiving stations, the improvement comprising: said ramp including a pair of movable rail sections adapted to receive the shanks of the fasteners therebetween and to underlie and support the heads on the fasteners, said movable rail sections being normally positioned with their lower ends continguous to the disk at the fastener receiving station and extending outwardly and upwardly therefrom, means swingably supporting said movable rail sections adjacent their upper ends for movement of their lower ends along a path generally tangent to the periphery of the disk at the fastener receiving station whereby the lower ends of the movable rail sections can move in the direction of rotation of the disk to keep fasteners from being jammed between the disk and the rail sections as the disk carries fasteners away from the fastener receiving station, and means for yieldably urging the said movable rail sections in a direction opposite the direction of rotation of the disk toward the normal position thereof and for holding the movable rail sections in generally parallel spaced relation during movement into and out of their normal position.

18. In a machine for performing work on fasteners of the type having a head and a shank, the machine including a frame, a disk having a plurality of fastener receiving recesses at its periphery, means connected to the disk to rotate the disk through spaced fastener receiving, work and exit stations, and a fastener feed ramp for feeding fasteners to the recesses in the disk at the fastener receiving station, the improvement comprising: said feed ramp including a pair of upper rail sections and a pair of lower rail sections in end-to-end relation and adapted to receive the shanks of the fasteners therebetween and to underlie and support the heads on the fasteners, said lower rail sections being normally positioned with their lower ends contiguous to the disk at the fastener receiving station and extending outwardly and upwardly therefrom, means pivotally connecting the upper ends of each of said lower rail sections to a respective upper rail section for swinging movement of the lower ends of the lower rail sections along a path generally tangent to the periphery of the disk at the fastener receiving station whereby the lower ends of the lower rail sections can move in the direction of rotation of the disk to keep fasteners from being jammed between the disk and the lower rail sections as the disk carries fasteners away from the fastener receiving station, adjustable stop means mounted on the lower rail sections engageable to limit relative movement of the lower rail sections toward each other to maintain the same in generally parallel spaced relation during movement into and out of their normal position, and spring means for yieldably urging the lower rail sections toward each other to normally engage said stop means and for yieldably urging the lower rail sections in a direction opposite the direction of rotation of the disk toward the normal position thereof.

19. In a machine for performing work on fasteners of the type having a head and a shank, the machine including a frame, a rotatable shaft mounted on said frame, a fastener-carrying disk secured on said shaft and having a plurality of circumferentially spaced fastener receiving pockets in its periphery, means connected with said shaft for rotating said disk in a plane through spaced fastener-receiving, work and exit stations, means at said work station for performing work on the fasteners carried by the disk, feed means at said fastener-receiving station for directing the shanks of said fasteners into the pockets on said disk with the heads on the fasteners overlying the pockets, and clamping mechanism supported by said frame engageable with the heads on the fasteners for holding the fasteners in the pockets on said disk as the latter is rotated from said fastener-receiving station, through said work station and to said exit station, the improvement comprising: said clamping mechanism including a turret, means mounting said turret on said frame for axial rotation in a plane overlying said disk and inclined relative to the plane of rotation of the disk to converge toward said work station, and means including a plurality of pressure applying members mounted on said turret and yieldably urged in a direction transverse to the plane of rotation of the turret and toward said disk for clamping the heads on fasteners against said disk as the disk is rotated from said fastener-receiving station, through said work station and to said exit station.

20. In a machine for performing work on fasteners of the type having a head and a shank, the machine including a frame, a rotatable shaft mounted on said frame, a fastener-carrying disk secured on said shaft and having a plurality of circumferentially spaced fastener receiving pockets in its periphery, indexing means connected with said shaft for rotating said disk in a plane through spaced fastener-receiving, work and exit stations, means at said work station for performing work on the fasteners carried by the disk, feed means at said fastener-receiving station for directing the shanks of said fasteners into the pockets on said disk with the heads of the fasteners overlying the pockets, and clamping mechanism supported by said frame engageable with the heads on the fasteners for holding the fasteners in the pockets on said disk as the latter is rotated from said fastener-receiving station, through said work station and to said exit station, the improvement comprising: said clamping mechanism including an adapter secured to said shaft above said disk and including a plurality of clamping members attached thereto and being urged away from said disk, a turret, means mounting said turret on said frame for axial rotation in a plane overlying said adapter and inclined relative to the plane of rotation of said disk to converge toward said work station, a plurality of pressure applying members mounted on said turret and yieldably urged in a direction transverse to the plane of rotation of the turret and toward said adapter, said pressure applying members engaging with said clamping members when the latter are located between said fastener-receiving and exit stations to connect said turret with said adapter so said turret rotates bodily therewith, said pressure applying members also urging said clamping members toward said disk to clamp the heads on the fasteners against said disk as the disk is rotated from said fastener-receiving station, through said work station and to said exit station.

* * * * *